(12) United States Patent
Okazaki et al.

(10) Patent No.: US 8,793,058 B2
(45) Date of Patent: Jul. 29, 2014

(54) CONTROL DEVICE FOR INTERNAL COMBUSTION ENGINE

(75) Inventors: Shuntaro Okazaki, Sunto-gun (JP);
Satoshi Yoshizaki, Gotemba (JP);
Masashi Shibayama, Sunto-gun (JP);
Kaoru Shokatsu, Susnono (JP); Hajime Kawakami, Susnono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 364 days.

(21) Appl. No.: 13/121,325

(22) PCT Filed: Oct. 12, 2010

(86) PCT No.: PCT/JP2010/067882
§ 371 (c)(1),
(2), (4) Date: Mar. 28, 2011

(87) PCT Pub. No.: WO2012/049734
PCT Pub. Date: Apr. 19, 2012

(65) Prior Publication Data
US 2012/0085318 A1    Apr. 12, 2012

(51) Int. Cl.
*B60T 7/12*    (2006.01)
(52) U.S. Cl.
USPC ........... 701/103; 701/104; 701/105; 123/399; 123/436
(58) Field of Classification Search
USPC .......... 123/399, 403, 406.23, 406.45, 406.47, 123/406.53, 406.55; 701/102–104, 113
See application file for complete search history.

(56) References Cited

U.S. PATENT DOCUMENTS

| | | | |
|---|---|---|---|
| 5,660,157 A * | 8/1997 | Minowa et al. | 123/344 |
| 5,979,404 A * | 11/1999 | Minowa et al. | 123/399 |
| 6,058,906 A | 5/2000 | Yoshino | |
| 6,178,943 B1 * | 1/2001 | Taga et al. | 123/295 |
| 6,425,373 B1 * | 7/2002 | Robichaux et al. | 123/436 |
| 7,520,263 B1 * | 4/2009 | Kim | 123/350 |

FOREIGN PATENT DOCUMENTS

| | | | |
|---|---|---|---|
| JP | 62-165549 A | 7/1987 | |
| JP | 6-207545 A | 7/1994 | |
| JP | 6-213039 A | 8/1994 | |
| JP | 6-264785 A | 9/1994 | |

(Continued)

*Primary Examiner* — Erick Solis
*Assistant Examiner* — Carl Staubach
(74) *Attorney, Agent, or Firm* — Sughrue Mion, PLLC

(57) ABSTRACT

A control device for an internal combustion engine provided by the present invention is a control device which can satisfy both a requirement relating to exhaust gas performance of the internal combustion engine and a requirement relating to operation performance by properly regulating a change speed of a required air-fuel ratio, in the internal combustion engine which uses torque and an air-fuel ratio as control variables. The control device receives the requirement relating to the exhaust gas performance of the internal combustion engine, and calculates an air-fuel ratio which satisfies the requirement as a required air-fuel ratio. When a predetermined reduction condition is not satisfied, an original required air-fuel ratio is directly determined as a final required air-fuel ratio. However, when the reduction condition is satisfied, the change speed is reduced by processing the signal of the original required air-fuel ratio, and determines the required air-fuel ratio with the change speed reduced as the final required air-fuel ration. The reduction condition includes a condition that the change amount of the original required air-fuel ratio, in more detail, a change amount per calculation period is larger than a predetermined air-fuel ratio change determination value.

6 Claims, 6 Drawing Sheets

(56) References Cited

FOREIGN PATENT DOCUMENTS

| | | |
|---|---|---|
| JP | 11-22505 A | 1/1999 |
| JP | 2002-47997 A | 2/2002 |
| JP | 2003-328809 A | 11/2003 |
| JP | 2006-138300 A | 6/2006 |
| JP | 2007-120326 A | 5/2007 |
| JP | 2007-162565 A | 6/2007 |
| JP | 2009-47101 A | 3/2009 |
| JP | 2009-47102 A | 3/2009 |
| JP | 2010-7489 A | 1/2010 |
| JP | 2010-53826 A | 3/2010 |
| JP | 2010-112214 A | 5/2010 |

* cited by examiner

CONTROL DEVICE FOR INTERNAL COMBUSTION ENGINE

CROSS REFERENCE TO RELATED APPLICATION

This application is a National Stage of International Application No. PCT/JP2010/067882 filed Oct. 12, 2010, the contents of all of which are incorporated herein by reference in their entirety.

TECHNICAL FIELD

The present invention relates to a control device for an internal combustion engine, and particularly to a control device for an internal combustion engine with torque and an air-fuel ratio used as control variables.

BACKGROUND ART

As one of the methods for controlling internal combustion engines, there is known the method which determines a manipulated variable of each actuator with torque and an air-fuel ratio used as controlled variables. For example, Japanese Patent Laid-Open No. 2010-7489 discloses the method which determines required torque and a required air-fuel ratio for an internal combustion engine, and determines the respective manipulated variables of a throttle, an ignition device, and a fuel injection device in order to realize the requirements. In regard with the throttle, a throttle opening degree which is a manipulated variable of the throttle is determined in accordance with the target air amount for realizing the required torque. For example, by using a reverse model of an air model, the throttle opening degree required for realizing the target air amount can be obtained by calculation.

Incidentally, an air-fuel ratio is also closely related to the torque generated by an internal combustion engine in addition to the air amount which is taken into cylinders. In the case of the same air amount, if the air-fuel ratio of the air-fuel mixture provided for combustion is leaner than stoichiometry, the torque is decreased, and if the air-fuel ratio of the air-fuel mixture is rich, the torque is increased. Therefore, in the process of converting required torque into a target air amount, the air-fuel ratio of the air-fuel mixture in the cylinder, that is, the required air-fuel ratio is desirably referred to. By setting the target air amount in accordance with the air-fuel ratio requirement, realization precision of the required torque can be enhanced.

However, a required air-fuel ratio is not always constant, and is sometimes positively changed from the viewpoint of the exhaust gas performance. For example, at the time of recovery from fuel cut, in order to restore the NOx reducing ability of a catalyst quickly, the required air-fuel ratio is made far richer than stoichiometry for a predetermined time period. Further, in order to enhance purification performance of the catalyst, the required air-fuel ratio is periodically changed with stoichiometry as the center, and the required air-fuel ratio is also changed by air-fuel ratio feedback control. In these cases, the target air amount also changes in accordance with a change in the required air-fuel ratio, and the throttle opening degree is controlled in accordance with it. The movement of the throttle at this time is such a movement as to cancel out the torque variation accompanying the change in the air-fuel ratio by an increase or a decrease of the air amount. That is to say, when the air-fuel ratio is changed to the rich side, the throttle is moved to the closing side so as to cancel out the increase in torque due to the change by a decrease in the air amount. In contrast with this, when the air-fuel ratio is changed to the lean side, the throttle is moved to the opening side so as to cancel out the decrease in torque due to the change by an increase in the air amount.

However, there is a delay in the response of the air amount to the movement of the throttle, and the actual air amount changes later with respect to the change in the target air amount. Therefore, when the required air-fuel ratio is suddenly changed, the change of the air amount does not catch up with the change in the required air-fuel ratio. As a result, problems as follows occur.

FIG. 7 is a diagram showing in a chart, a change with time of each of torque, a rotational speed, an air-fuel ratio, a fuel injection amount, a cylinder intake air amount, and a throttle opening degree when a required air-fuel ratio is suddenly changed. In the chart of each stage, the dotted line shows the change with time of the required value or the target value of each item, and the solid line shows the actual behavior of each item. As shown in the drawing, when the required air-fuel ratio is suddenly changed to the lean side stepwise, the target air amount is suddenly increased stepwise correspondingly. However, the throttle opening degree cannot be increased stepwise, there is a delay in the response of the air amount with respect to the movement of the throttle, and therefore, the actual air amount is increased later than the target air amount.

The fuel injection amount is determined by the actual air amount and the required air-fuel ratio, and therefore, the fuel injection amount is temporarily decreased significantly due to the delay of increase of the air amount. As a result, the torque generated by the internal combustion engine is temporarily reduced significantly to be smaller than the required torque, and the engine speed is also temporarily reduced significantly. With this, a variation also occurs to the actual air-fuel ratio. According to the art described in Japanese Patent Laid-Open No. 2010-7489, when a deviation can occur between the actual torque and the required torque, the ignition timing is regulated to compensate for the deviation. However, when the ignition timing is set at the optimal ignition timing, it is difficult to increase the torque more than the torque at the optimal ignition timing, though the torque can be reduced by retardation of the ignition timing. Therefore, when the required air-fuel ratio is suddenly changed to the lean side, temporary reduction in the torque and the rotational speed as shown in FIG. 7 occurs.

More specifically, in the aforementioned conventional control method, not only the driving performance is likely to be impaired by variations in the torque and the rotational speed, but also reduction in emission performance is likely to be caused by the unintended variation in the air-fuel ratio as a result.

CITATION LIST

Patent Literature

Patent Literature 1: Japanese Patent Laid-Open No. 2010-7489
Patent Literature 2: Japanese Patent Laid-Open No. 2006-138300
Patent Literature 3: Japanese Patent Laid-Open No. 6-207545
Patent Literature 4: Japanese Patent Laid-Open No. 2009-47102
Patent Literature 5: Japanese Patent Laid-Open No. 2002-47997
Patent Literature 6: Japanese Patent Laid-Open No. 2007-120326

Patent Literature 7: Japanese Patent Laid-Open No. 2010-112214

Patent Literature 8: Japanese Patent Laid-Open No. 2010-53826

Patent Literature 9: Japanese Patent Laid-Open No. 2009-47101

Patent Literature 10: Japanese Patent Laid-Open No. 2007-162565

SUMMARY OF INVENTION

As the solution to the aforementioned problems, reducing the change speed of the required air-fuel ratio is conceivable. As the means for reducing the change speed of the required air-fuel ratio, for example, a low-pass filter such as a first-order lag filter, and an averaging operation such as weighted average can be cited. By reducing the change speed of the required air-fuel ratio, a delay in the change of the air amount with respect to the change of the required air-fuel ratio can be eliminated. Alternatively, though a delay in the change of the air amount with respect to the change in the required air-fuel ratio cannot be completely eliminated, the delay can be sufficiently reduced so that a torque variation does not occur.

However, it is not always preferable from the viewpoint of the emission performance to reduce the change speed of the required air-fuel ratio uniformly without exception. For example, when the required air-fuel ratio gradually changes, the effect in the exhaust gas performance which can be obtained by positively changing the required air-fuel ratio is likely to be lost by further reducing the change speed.

Thus, the present invention has an object to satisfy both a requirement relating to exhaust gas performance of an internal combustion engine and a requirement relating to operation performance by properly regulating a change speed of a required air-fuel ratio in an internal combustion engine with torque and an air-fuel ratio used as control variables. In order to attain such an object, the present invention provides a control device for an internal combustion engine as follows.

The control device which the present invention provides determines a required value of torque generated by an internal combustion engine, that is, required torque, and determines a required value of an air-fuel ratio of an air-fuel mixture provided for combustion, that is, a required air-fuel ratio. On determination of the required air-fuel ratio, the present control device first receives a requirement relating to exhaust gas performance of the internal combustion engine, and calculates an air-fuel ratio which satisfies the requirement as the required air-fuel ratio. If a predetermined reduction condition which will be described later is not satisfied, the control device determines the calculated required air-fuel ratio directly as a final required air-fuel ratio. However, if the reduction condition which will be described later is satisfied, the control device processes the signal of the calculated required air-fuel ratio, reduces the change speed thereof, and determines the required air-fuel ratio, the change speed of which is reduced, as the final required air-fuel ratio. As specific means which reduces the change speed, a low-pass filter such as a first-order lag filter, and an averaging operation such as weighted average can be used.

The present control device calculates a target air amount for realizing the required torque under the required air-fuel ratio which is determined as above. For calculation of the target air amount, the data with a relationship between torque generated by the internal combustion engine and an air amount taken into a cylinder set by being linked with the air-fuel ratio can be used. The present control device operates an actuator for air amount control in accordance with the target air amount, and operates an actuator for fuel injection amount control in accordance with the required air-fuel ratio.

Here, the reduction condition includes the condition that the change amount of the calculated required air-fuel ratio, in more detail, the change amount per calculation period is larger than a predetermined air-fuel ratio change determination value. More specifically, the present control device uses the required air-fuel ratio with the change speed reduced as the final required air-fuel ratio if the change amount of the calculated required air-fuel ratio (original required air-fuel ratio) is larger than the air-fuel ratio change determination value, but uses the original required air-fuel ratio directly as the final required air-fuel ratio if the change amount is the air-fuel ratio change determination value or less.

According to the control device which is configured as above, when the calculated value of the required air-fuel ratio abruptly changes, the required air-fuel ratio with the change speed reduced is used for calculation of the target air amount, and therefore, the response delay of the actual air amount to the target air amount can be eliminated or sufficiently reduced. As a result, according to the present control device, the delay of the change of the air amount to the change of the required air-fuel ratio can be eliminated or sufficiently reduced, and the operation performance can be kept with the torque variation accompanying the change of the required air-fuel ratio being suppressed. Further, a change itself of the required air-fuel ratio is allowed though the change speed is reduced, and therefore, the effect in the exhaust gas performance which can be obtained by positively changing the required air-fuel ratio can be ensured. Meanwhile, when the change of the calculated value of the required air-fuel ratio is slow, the original required air-fuel ratio is directly used for fuel injection amount control, and therefore, the effect in the exhaust gas performance which is obtained by positively changing the required air-fuel ratio can be obtained as expected. More specifically, according to the present control device, the requirement relating to the exhaust gas performance of the internal combustion engine and the requirement relating to the operation performance can be both satisfied.

The reduction condition may further include the condition that a load of the internal combustion engine is larger than a predetermined load determination value. More specifically, when the load of the internal combustion engine is larger than the load determination value, and the change amount of the original required air-fuel ratio is larger than the air-fuel ratio change determination value, the required air-fuel ratio with the change speed reduced may be used as the final required air-fuel ratio. As the load of the internal combustion engine, the target air amount, or the estimated air amount which is estimated from the operation state of the actuator for air amount control can be used.

The generation torque of the internal combustion engine is small at the time of a low load, the torque variation accompanying the change of the required air-fuel ratio is relatively small, and therefore, even if the change speed of the required air-fuel ratio is not reduced, the torque variation can be suppressed to be small. Accordingly, the condition that the load of the internal combustion engine is larger than the load determination value is added to the reduction condition, whereby the operation with the air-fuel ratio which most satisfies the requirement relating to the exhaust gas performance can be performed in a wider operation region.

Furthermore, as the method of adding the load of the internal combustion engine to the reduction condition, making the air-fuel ratio change determination value variable in accordance with the load of the internal combustion engine may be adopted. More specifically, the air-fuel ratio change determination value is determined from the load of the internal combustion engine, and if the change amount of the required air-fuel ratio is larger than the air-fuel ratio change determination value, the required air-fuel ratio with the change speed reduced may be used as the final required air-fuel ratio. In this case, as the load is smaller, the air-fuel ratio change determination value can be set at a larger value. According to this, an operation with the air-fuel ratio which most satisfies the requirement relating to the exhaust gas performance can be performed in a wider operation range.

Incidentally, according to a more preferable mode of the present invention, the control device can carry out ignition timing control as follows in combination, in addition to the aforementioned air amount control and fuel injection amount control.

First, the present control device increases the target air amount to compensate for a decrease of torque accompanying retardation of an ignition timing, when there is a requirement for retarding the ignition timing from an optimal ignition timing. As a specific method of it, it is preferable to determine the required value of the ratio of torque which is actually outputted with respect to the potential torque which the internal combustion engine can output, that is, the required efficiency in accordance with the state of the internal combustion engine and the environmental condition, and to divide the value of the required torque for use in calculation of the target air amount by the required efficiency to thereby increase the target air amount.

In this case, the present control device operates an actuator for air amount control in accordance with the increased target air amount, and operates an actuator for ignition timing control so that the torque realized under the required air-fuel ratio in this case corresponds to the required torque. As a specific method thereof, it is preferable to calculate the estimated potential torque under the required air-fuel ratio in the case of operating the actuator for air amount control in accordance with the target air amount, subsequently calculate the ratio of the required torque and the estimated potential torque, and operate the actuator for ignition timing control with that ratio set as the indication efficiency.

By performing the ignition timing control as above, a variation of the torque accompanying the change of the required air-fuel ratio can be compensated for by correction of the ignition timing. More specifically, the precision of realization of the required torque can be more enhanced.

In this case, the reduction condition may further include the condition that a retardation amount of the ignition timing with respect to the optimal ignition timing is smaller than a predetermined threshold value. In the case of the specific method, it is preferable to include the condition that the required efficiency is larger than a predetermined threshold value which is smaller than one, in the reduction condition. In the case of comparison under the same load condition, as the ignition timing is more retarded from the optimal ignition timing, the generation torque of the internal combustion engine becomes smaller. Therefore, the torque variation accompanying the change of the required air-fuel ratio becomes relatively small, and the torque variation is suppressed to be small even if the change speed of the required air-fuel ratio is not reduced. Accordingly, by adding it to the reduction condition that the retardation amount of the ignition timing with respect to the optimal ignition timing is larger than the threshold value, an operation with the air-fuel ratio which most satisfies the requirement relating to the exhaust gas performance can be performed in a wider operation region.

As the operation condition for retarding the ignition timing from the optimal ignition timing, the case of performing an idling operation of the internal combustion engine, the case of performing a warming-up operation at a time of start of the internal combustion engine and the like can be cited. In the idling operation, retardation of the ignition timing for ensuring the reserve torque is performed, and in the warming-up operation at the time of start, retardation of the ignition timing is performed to raise the temperature of the exhaust gas which is supplied to the catalyst. Accordingly, the reduction conditions may include the condition that the internal combustion engine is not under an idling operation, and the condition that the internal combustion engine is not under a warming-up operation at the time of start.

DESCRIPTION OF EMBODIMENTS

Embodiment 1

Embodiment 1 of the present invention will be described with reference to the drawings.

In embodiment 1 of the present invention, an internal combustion engine (hereinafter, an engine) which is a control object in embodiment 1 of the present invention is a spark ignition type four cycle reciprocating engine. A catalyst device for purifying an exhaust gas is provided in an exhaust passage of the engine. The control device controls the operation of the engine by operating actuators included in the engine. The actuators which can be operated by the control device include an ignition device, a throttle, a fuel injection device, a variable valve timing mechanism, an EGR device and the like. However, in the present embodiment, the control device operates the throttle, the ignition device and the fuel injection device, and the control device controls the operation of the engine by operating these three actuators.

The control device of the present embodiment uses torque, an air-fuel ratio and an efficiency as control variables of the engine. The torque described here more strictly means indicated torque generated by the engine, and the air-fuel ratio means the air-fuel ratio of the air-fuel mixture provided for combustion. The efficiency in the present description means the ratio of the torque which is actually outputted with respect to potential torque which the engine can output. The maximum value of the efficiency is one, and at this time, the potential torque which the engine can output is actually outputted directly. When the efficiency is smaller than one, the actually outputted torque is smaller than the potential torque the engine can output, and the surplus mainly becomes heat to be outputted from the engine.

Figure 1:
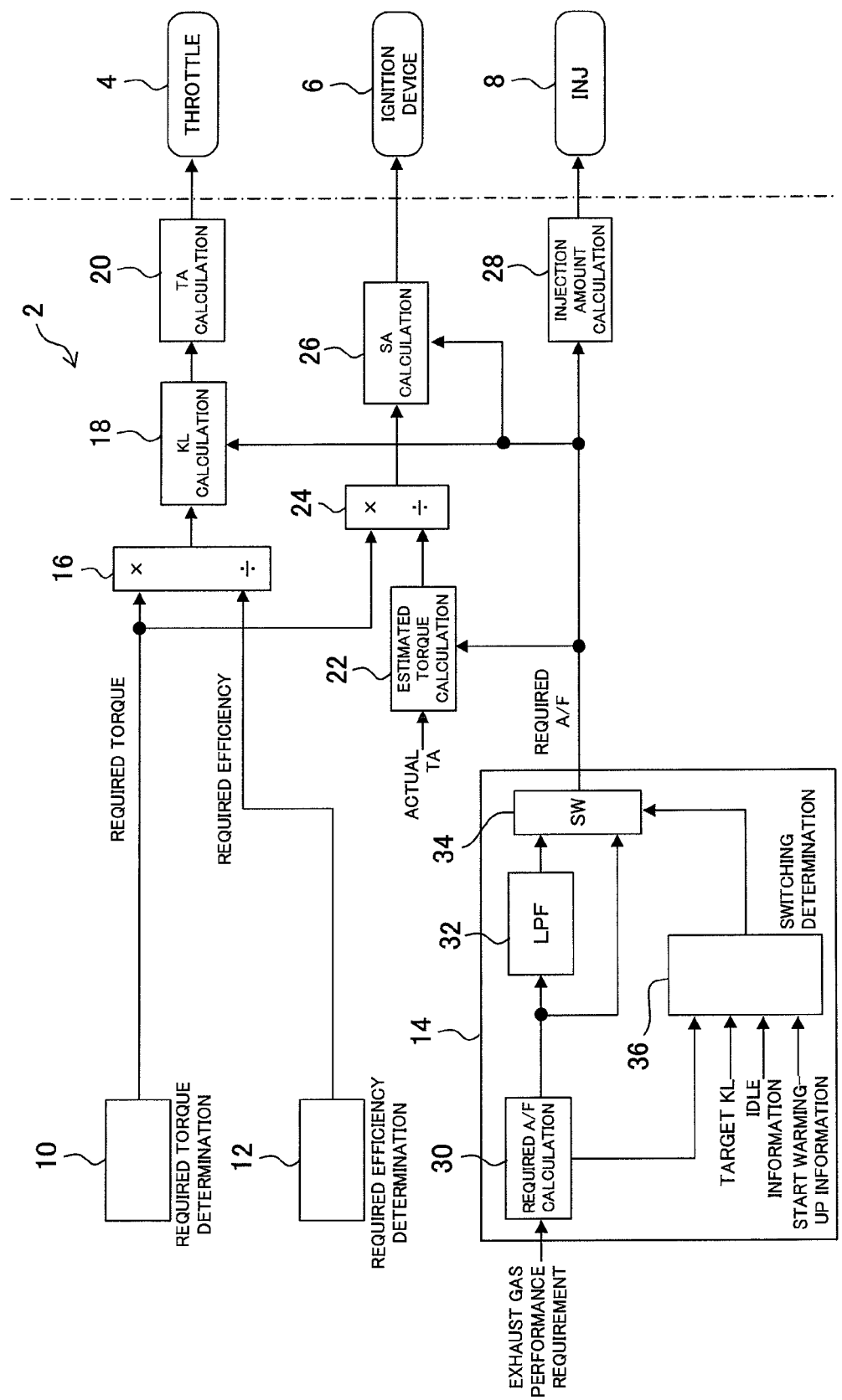
FIG. 1 is a block diagram showing a configuration of a control device of embodiment 1 of the present invention.

A control device 2 shown in the block diagram of FIG. 1 shows a configuration of the control device of the present embodiment. Respective elements configuring the control device 2 in FIG. 1 are the result of especially expressing in the drawing only the elements relating to torque control and air-fuel ratio control by operation of three kinds of actuators, that is, a throttle 4, an ignition device 6 and a fuel injection device (INJ) 8, among various functional elements which the control device 2 has. Accordingly, FIG. 1 does not mean that the control device 2 is configured by only these elements. The respective elements may be each configured by special hardware, or may share hardware and may be virtually configured by software.

Hereinafter, the entire configuration of the control device 2 will be described with the description centered on the function of each of the elements shown in FIG. 1.

First, the control device 2 determines required torque, a required efficiency and a required air-fuel ratio (required A/F) as the requirements to the control variables of the engine.

Determination of the required torque is performed in a required torque determining unit 10. The required torque determining unit 10 determines the required torque in accordance with the operation conditions of the engine, more specifically, the operating amount of an accelerator pedal by a driver, and the signals from the control systems of the vehicle such as VSC and TRC.

Determination of the required efficiency is performed in a required efficiency determining unit 12. As will be described later, the ignition timing is controlled to an optimal ignition timing by setting the required efficiency at one, and by setting the required efficiency at a value smaller than one, the ignition timing is retarded from the optimal ignition timing. However, in the present embodiment, the required efficiency determining unit 12 is assumed to fix the required efficiency to one which is the maximum value.

Determination of the required air-fuel ratio is performed in a required air-fuel ratio determining unit 14. One of the features of the present embodiment is the method for determining a required air-fuel ratio which is adopted in the required air-fuel ratio determining unit 14. Accordingly, the configuration and the function of the required air-fuel ratio determining unit 14 will be described in detail later.

The required air-fuel ratio which is determined in the required air-fuel ratio determining unit 14 is inputted in a fuel injection amount calculating unit 28. When calculation timing of the fuel injection amount comes in a certain cylinder, the fuel injection amount calculating unit 28 calculates the fuel injection amount from the required air-fuel ratio and an estimated air amount (estimated load rate) at an intake valve closing timing of the cylinder. As is already known widely, the estimated air amount can be calculated from the future value of the throttle opening degree which is obtained by throttle delay control which will be described later.

The control device 2 performs operation of the fuel injection device 8 so as to realize the fuel injection amount calculated in the fuel injection amount calculating unit 28.

Meanwhile, the required torque determined in the required torque determining unit 10, and the required efficiency determined in the required efficiency determining unit 12 are inputted in an air amount controlling torque calculating unit 16. The air amount controlling torque calculating unit 16 calculates air amount controlling torque by dividing the required torque by the required efficiency. When the required efficiency is smaller than one, the air amount controlling torque is increased to be larger than the required torque.

The air amount controlling torque is inputted in a target air amount calculating unit 18. The target air amount calculating unit 18 converts the air amount controlling torque into a target air amount (KL) by using an air amount map. The air amount described here means an air amount which is taken into a cylinder (a charge efficiency rate or a load rate which is the result of making the air amount dimensionless can be used instead). The air amount map is a map in which torque and an air amount are linked with each other with various engine state amounts including an engine speed and an air-fuel ratio as a key on the precondition that the ignition timing is an optimal ignition timing (an ignition timing at a more retarded side out of MBT and trace knock ignition timing). The air amount map is created based on the data obtained by testing the engine. For search of the air amount map, the actual values and the target values of the engine state amounts are used. With regard to the air-fuel ratio, the required air-fuel ratio which is determined in the required air-fuel ratio determining unit 14 is used for map search. Accordingly, in the target air amount calculating unit 18, the air amount which is required for realization of the air amount controlling torque under the required air-fuel ratio is calculated as the target air amount of the engine. When the required efficiency is smaller than one, the target air amount is increased. This means that the throttle 4 is required to be potentially capable of outputting torque larger than the required torque.

The target air amount is inputted in a target throttle opening degree calculating unit 20. The target throttle opening degree calculating unit 20 converts the target air amount (KL) into a throttle opening degree (TA) by using the reverse model of an air model. The air model is a physical model which is the result of modeling the response characteristic of the air amount with respect to the operation of the throttle 4, and therefore, the throttle opening degree required for achievement of the target air amount can be counted backward by using the reverse model of it.

The control device 2 performs operation of the throttle 4 in accordance with the throttle opening degree calculated in the target throttle opening degree calculating unit 20. However, throttle delay control is sometimes carried out in order to make the future value of the throttle opening degree predictable. In such a case, a deviation corresponding to a delay time occurs between the target throttle opening degree calculated in the throttle opening degree calculating unit 20 and the actual throttle opening degree realized by the operation of the throttle 4.

The control device 2 carries out calculation of the estimated torque based on an actual throttle opening degree (actual TA) in an estimated torque calculating unit 22 parallel with the above described processing. The estimated torque in the present description is the estimated value of the torque which can be outputted when the ignition timing is set at the optimal ignition timing under the present throttle opening degree, that is, the torque which can be potentially outputted by the engine. The estimated torque calculating unit 22 first converts the throttle opening degree into the estimated air amount by using a normal model of the aforementioned air model. Next, the estimated torque calculating unit 22 converts the estimated air amount into the estimated torque by using a torque map. The torque map is the reverse map of the aforementioned air amount map, and is the map in which the air amount and the torque are linked with each other with various engine state amounts as a key on the precondition that the ignition timing is the optimal ignition timing. In search of the torque map, the required air-fuel ratio determined in the required air-fuel ratio determining unit 14 is used. Accordingly, in the estimated torque calculating unit 22, the torque which is estimated to be realized by the estimated air amount under the required air-fuel ratio is calculated.

The estimated torque is inputted in an ignition timing controlling efficiency calculating unit 24 with the duplicated target torque. The ignition timing controlling efficiency calculating unit 24 calculates a ratio of the required torque and the estimated torque. The calculated ratio means the efficiency for realizing the required torque, and is used as an indication efficiency for controlling the ignition timing. The indication efficiency for controlling the ignition timing is inputted in an ignition timing calculating unit 26.

The ignition timing calculating unit 26 calculates an ignition timing (SA) from the inputted indication efficiency for controlling the ignition timing. In more detail, the ignition timing calculating unit 26 calculates the optimal ignition timing based on the engine state amounts such as the engine speed, the required torque and the air-fuel ratio, and calculates a retardation amount with respect to the optimal ignition timing from the inputted indication efficiency for controlling the ignition timing. If the indication efficiency is one, the retardation amount is set as zero, and the retardation angle is made larger as the indication efficiency is smaller than one. Subsequently, the ignition timing calculating unit 26 calculates the result of addition of the retardation amount to the optimal ignition timing as a final ignition timing. For calculation of the optimal ignition timing, for example, a map in which the optimal ignition timing and various engine state amounts are linked with each other can be used. For calculation of the retardation amount, for example, a map in which the retardation amount, the efficiency and various engine state amounts are linked with one another can be used. In searching these maps, the actual values and the target values of the engine state amounts are used. With regard to the air-fuel ratio, the required air-fuel ratio which is determined in the required air-fuel ratio determining unit 14 is used for map search.

The control device 2 performs an operation of the ignition device 6 in accordance with the ignition timing calculated in the ignition timing calculating unit 26. In the present embodiment, the required efficiency is fixed to one as described above, and therefore, the indication efficiency is also kept at one in a steady state. Therefore, the ignition timing in the steady state is kept at the optimal ignition timing.

Next, a configuration and a function of the required air-fuel ratio determining unit 14 which is a main unit of the control device 2 of the present embodiment will be described in detail.

The required air-fuel ratio determining unit 14 is configured by a required air-fuel ratio calculating unit 30, a low-pass filter (LPF) 32, a switch 34 and a switching determining unit 36. The required air-fuel ratio calculating unit 30 has the function of receiving a requirement relating to the exhaust gas performance of the engine, and calculating the air-fuel ratio which satisfies the requirement as the required air-fuel ratio. In detail, setting of a normal required air-fuel ratio is at stoichiometry, but the setting is changed to the lean side or the rich side when it is necessary from the viewpoint of the exhaust gas performance. For example, the required air-fuel ratio is changed periodically with stoichiometry as a center in order to enhance the purification performance of a catalyst, and the required air-fuel ratio is changed by air-fuel ratio feedback control. Further, at a time of recovery from fuel cut, the required air-fuel ratio is made significantly rich from stoichiometry for a predetermined time period in order to restore the $NO_X$ reducing ability of the catalyst quickly.

The required air-fuel ratio outputted from the required air-fuel ratio calculating unit 30 is divided into two, and one of the required air-fuel ratios is passed through the low-pass filter 32 and thereafter, is inputted in the switch 34. The other required air-fuel ratio is directly inputted in the switch 34. The low-pass filter 32 is, for example, a first-order lag filter, and is provided to reduce the change speed of the required air-fuel ratio. The switch 34 selects any one of the inputted required air-fuel ratios, that is, any one of the required air-fuel ratio with the change speed reduced, and the original required air-fuel ratio in accordance with the instruction of the switching determining unit 36. The required air-fuel ratio selected by the switch 34 is determined as a final required air-fuel ratio, and is outputted from the required air-fuel ratio determining unit 14.

Switching determination by the switching determining unit 36 is performed based on the change amount of the required air-fuel ratio, in more detail, the change amount in each calculation period. The switching determining unit 36 calculates the change amount of the required air-fuel ratio calculated in the required air-fuel ratio calculating unit 30 for each calculation period, and determines whether or not the value of the change amount is larger than a preset determination value (air-fuel ratio change determination value). When the result of the determination is affirmative, the switching determining unit 36 issues an instruction to the switch 34 to select the required air-fuel ratio processed in the low-pass filter 32. In contrast with this, when the result of the determination is negative, the switching determining unit 36 issues an instruction to the switch 34 to select the original required air-fuel ratio calculated in the required air-fuel ratio calculating unit 30.

Figure 2:
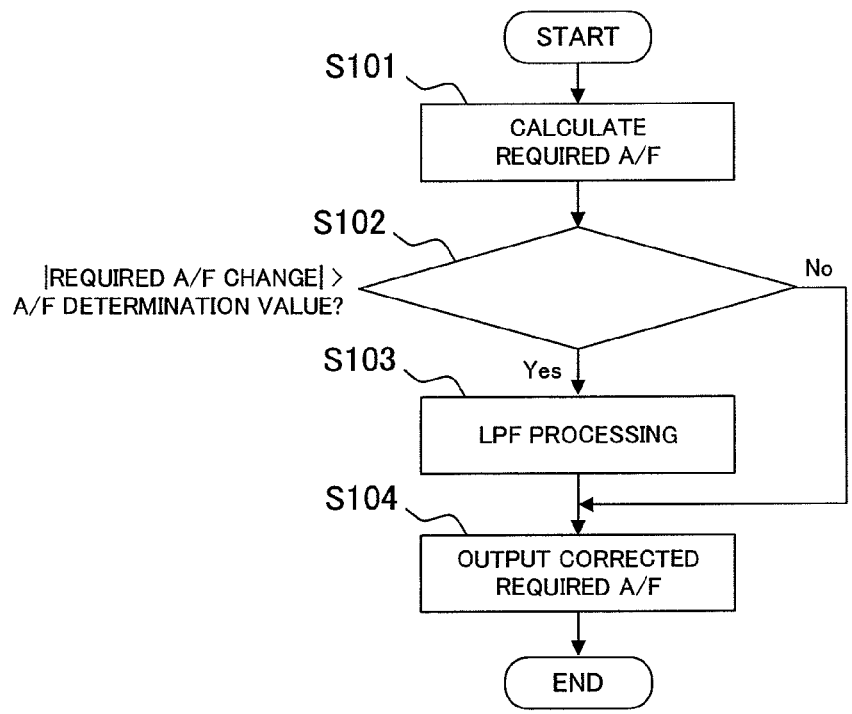
FIG. 2 is a flowchart showing processing performed by the control device of embodiment 1 of the present invention.

FIG. 2 is a diagram showing the processing performed in the required air-fuel ratio determining unit 14 in a flowchart. According to the flowchart, the required air-fuel ratio is calculated in the first step S101. Next, it is determined whether or not the change amount per calculation period of the required air-fuel ratio is larger than the air-fuel ratio change determination value (step S102). If the determination result of step S102 is affirmative, the change speed of the required air-fuel ratio is reduced by the low-pass filter 32 (step S103). The required air-fuel ratio with the change speed reduced is outputted as the final required air-fuel ratio (corrected required air-fuel ratio) (step S104). If the determination result of step S102 is negative, the original required air-fuel ratio without reduction in the change speed is directly outputted as the final required air-fuel ratio (corrected required air-fuel ratio) (step S104).

Figure 3:
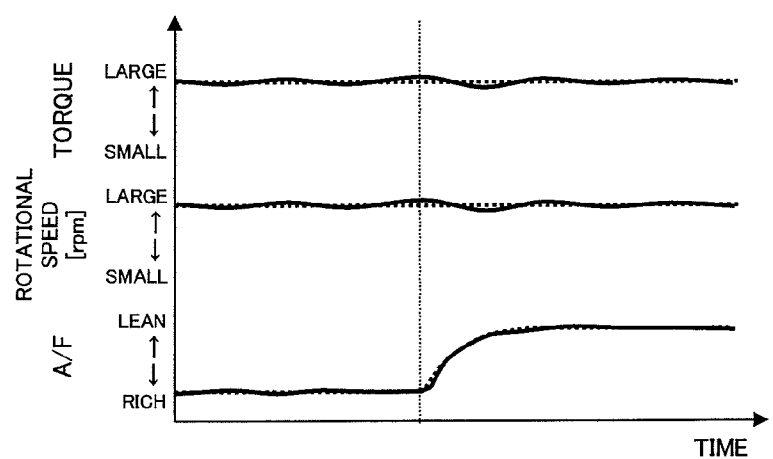
FIG. 3 is a diagram for describing an operation of a low-pass filter used by the control device of embodiment 1 of the present invention.

According to the control device 2 of the present embodiment configured as above, when the calculation value of the required air-fuel ratio is abruptly changed due to the requirement relating to the exhaust gas performance of the engine, the required air-fuel ratio with the change speed reduced by the low-pass filter 32 is used for calculation of the target air amount. As a result, a response delay of the actual air amount to the target air amount can be eliminated or sufficiently reduced. FIG. 3 is a view showing in a chart a change with time of each of the torque, the rotational speed, and the air-fuel ratio when the change speed of the required air-fuel ratio is reduced by the low-pass filter 32. According to the control device 2 of the present embodiment, a delay in change of the air amount with respect to the change in the required air-fuel ratio can be eliminated or sufficiently reduced, and therefore, as shown in FIG. 3, the variations in torque and rotational speed accompanying a change of the required air-fuel ratio are suppressed to be able to keep the operation performance. Further, the variation in the air-fuel ratio with respect to the required air-fuel ratio can be suppressed, and therefore, the effect in the exhaust gas performance also can be ensured.

Meanwhile, when the change of the calculation value of the required air-fuel ratio is slow, the original required air-fuel ratio which is not processed by the low-pass filter 32 is directly used for fuel injection amount control. Therefore, the effect in the exhaust gas performance which can be obtained by positively changing the required air-fuel ratio can be obtained as expected. As a matter of course, a delay in change of the air amount with respect to the change of the required air-fuel ratio in this case is sufficiently small, and therefore, variations in the torque and the rotational speed accompanying the change of the required air-fuel ratio can be suppressed to be low. More specifically, according to the control device 2 of the present embodiment, the requirement relating to the exhaust gas performance of the engine, and the requirement relating to the operation performance can be both satisfied.

Embodiment 2

Embodiment 2 of the present invention will be described with reference to the drawings.

A difference between the present embodiment and embodiment 1 lies in the determination method of the required air-fuel ratio by the required air-fuel ratio determining unit 14. In more detail, the difference lies in the content of the switching determination of the switch 34 by the switching determining unit 36. Switching determination by the switching determining unit 36 of the present embodiment is performed based on the magnitude of the load of the engine in addition to the change amount of the required air-fuel ratio. This is because the magnitude of the load of the engine is related to the magnitude of the torque variation in the case of the required air-fuel ratio being changed. More specifically, the generation torque of the engine is small at the time of a low load, and the torque variation accompanying the change of the required air-fuel ratio is relatively small. Therefore, if the load of the engine is relatively small, the torque variation can be suppressed to be small without reducing the change speed of the required air-fuel ratio.

Figure 4:
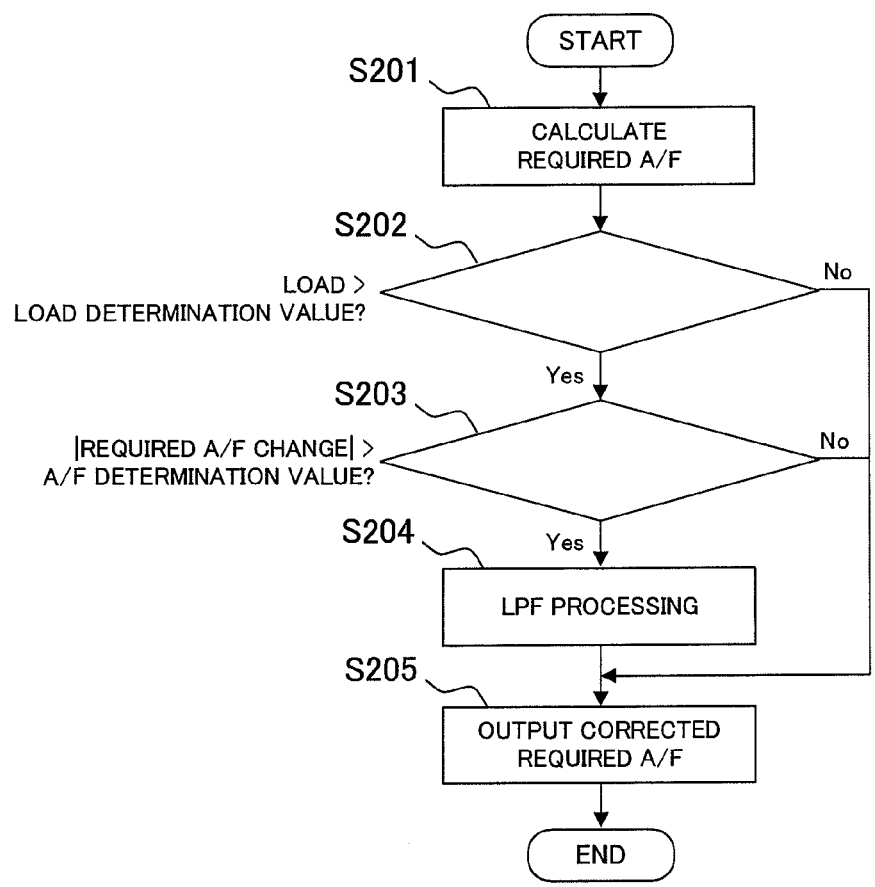
FIG. 4 is a flowchart showing processing performed by a control device of embodiment 2 of the present invention.

FIG. 4 is a diagram expressing the processing performed in the required air-fuel ratio determining unit 14 in the present embodiment in a flowchart. According to the flowchart, the required air-fuel ratio is calculated in the first step S201. Next, it is determined whether or not the magnitude of the load of the engine is larger than the load determination value (step S202). As the load of the engine, the target air amount calculated in the target air amount calculating unit 18, or the estimated air amount estimated from the actual opening degree of the throttle 4 can be used. If the determination result of step S202 is affirmative, it is further determined whether or not the change amount per calculation period of the required air-fuel ratio is larger than the air-fuel ratio change determination value (step S203). If the determination result of step S203 is affirmative, the change speed of the required air-fuel ratio is reduced by the low-pass filter 32 (step S204). Subsequently, the required air-fuel ratio with the change speed reduced is outputted as the final required air-fuel ratio (corrected required air-fuel ratio) (step S205). Meanwhile, if the determination result of step S202 is negative, or if the determination result of step S203 is negative, the original required air-fuel ratio without reduction in the change speed is directly outputted as the final required air-fuel ratio (corrected required air-fuel ratio) (step S205).

According to the present embodiment, the condition that the load of the engine is relatively large is added to the conditions for reducing the change speed of the required air-fuel ratio, and thereby, an operation with the air-fuel ratio which most satisfies the requirement relating to the exhaust gas performance can be performed in a wider operation range.

Embodiment 3

Embodiment 3 of the present invention will be described with reference to the drawings.

The present embodiment is common to embodiment 2 in the point that the magnitude of the load of the engine is added to the conditions for reducing the change speed of the required air-fuel ratio. However, the present embodiment is characterized in that the air-fuel ratio change determination value which is the determination reference about the value of the change amount of the required air-fuel ratio is made variable in accordance with the load of the engine.

Figure 5:
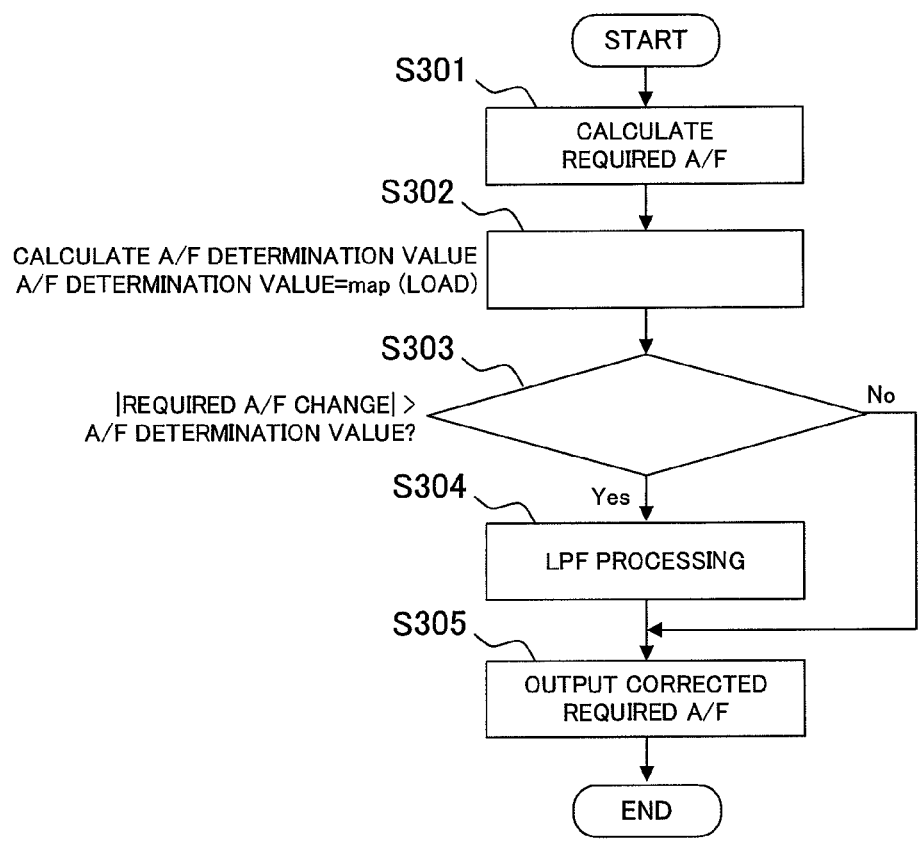
FIG. 5 is a flowchart showing processing performed by a control device of embodiment 3 of the present invention.

FIG. 5 is a diagram expressing the processing performed in the required air-fuel ratio determining unit 14 in the present embodiment in a flowchart. According to the flowchart, the required air-fuel ratio is calculated in the first step S301. Next, the map stored in the switching determining unit 36 is referred to, and the air-fuel ratio change determination value corresponding to the load of the engine is calculated (step S302). According to the relationship between the load and the air-fuel ratio change determination value in the map, as the load is smaller, the air-fuel ratio change determination value becomes larger. Next, it is determined whether or not the change amount per calculation period of the required air-fuel ratio is larger than the air-fuel ratio change determination value (step S303). If the determination result of step S303 is affirmative, the change speed of the required air-fuel ratio is reduced by the low-pass filter 32 (step S304). Subsequently, the required air-fuel ratio with the change speed reduced is outputted as the final required air-fuel ratio (corrected required air-fuel ratio) (step S305). Meanwhile, if the determination result of step S303 is negative, the original required air-fuel ratio without reduction in the change speed is directly outputted as the final required air-fuel ratio (corrected required air-fuel ratio) (step S305).

According to the present embodiment, the reference for determining the value of the change amount of the required air-fuel ratio is made variable in accordance with the load of the engine, whereby an operation with the air-fuel ratio which most satisfies the requirement relating to the exhaust gas performance can be performed in a wider operation range.

Embodiment 4

Embodiment 4 of the present invention will be described with reference to the drawings.

In the present embodiment, the required efficiency determining unit 12 sets the required efficiency at a value smaller than one in accordance with the state of the engine and the environmental conditions. More specifically, the required efficiency determining unit 12 determines the required efficiency to be a value smaller than one to retard the ignition timing from the optimal ignition timing, when the temperature of the exhaust gas is desired to be raised in the warming-up operation at the time of start of the engine, and when reserve torque is desired to be made in an idling operation of the engine.

When the load conditions of the engine are the same, the generation torque of the engine becomes smaller as the ignition timing is retarded more from the optimal ignition timing. Therefore, the torque variation accompanying the change of the required air-fuel ratio also relatively becomes small, and the torque variation can be suppressed to be small even if the change speed of the required air-fuel ratio is not reduced.

Thus, in the present embodiment, processing of the required air-fuel ratio by the low-pass filter 32 is not performed, in the situation where the ignition timing is retarded, as in the cases in which the engine is under an idling operation and under a warming-up operation at the time of start.

Figure 6:
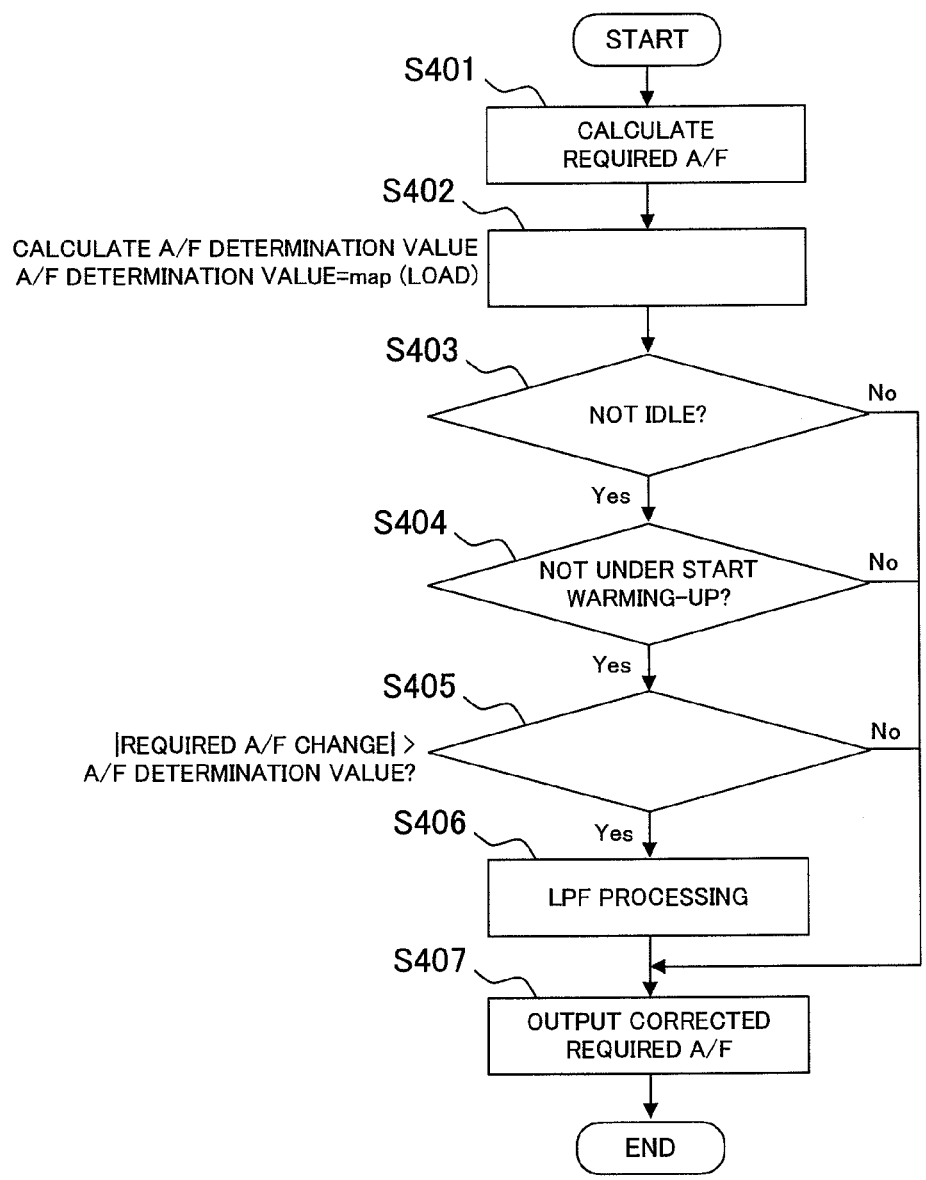
FIG. 6 is a flowchart showing processing performed by a control device of embodiment 4 of the present invention.
Figure 7:
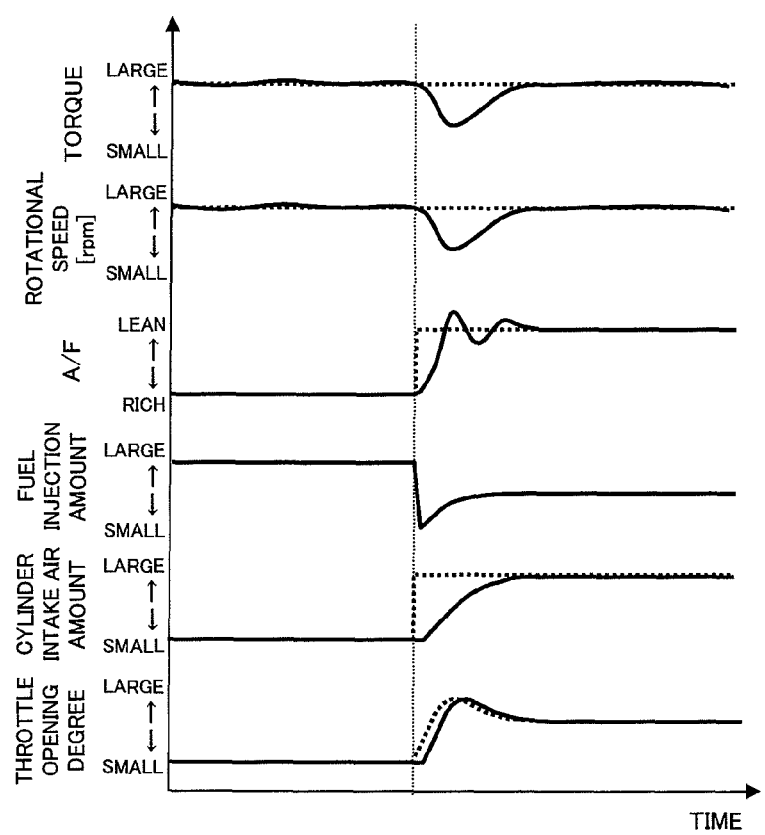
FIG. 7 is a diagram for describing a conventional problem.

FIG. 6 is a diagram expressing the processing which is performed in the required air-fuel ratio determining unit 14 in the present embodiment in a flowchart. According to the flowchart, the required air-fuel ratio is calculated in the first step S401. Next, a map stored in the switching determining unit 36 is referred to, and the air-fuel ratio change determination value corresponding to the load of the engine is calculated (step S402). Subsequently, it is determined whether or not the engine is under an idling operation (step S403). If the determination result of step S403 is affirmative, it is further determined whether or not the engine is under a warming-up operation (step S404). If the determination result of step S404 is affirmative, it is further determined whether or not the change amount per calculation period of the required air-fuel ratio is larger than the air-fuel ratio change determination value (step S405). If the determination result of step S405 is affirmative, the change speed of the required air-fuel ratio is reduced by the low-pass filter 32 (step S406). The required air-fuel ratio with the change speed reduced is outputted as a final required air-fuel ratio (corrected required air-fuel ratio) (step S407). Meanwhile, if the determination result of step S403 is negative, or the determination result of step S404 is negative, or if the determination result of step S405 is negative, the original required air-fuel ratio without reduction in the change speed is directly outputted as the final required air-fuel ratio (corrected required air-fuel ratio) (step 407).

According to the present embodiment, the condition that the retardation amount with respect to the optimal ignition timing, of the ignition timing is relatively large is added to the reduction conditions, and thereby, an operation with the air-fuel ratio which most satisfies the requirement relating to the exhaust gas performance can be performed in a wider operation region.

Others

The embodiments of the present invention are described above, but the present invention is not limited to the aforementioned embodiments, and can be carried out by being variously modified within the range without departing from the gist of the present invention. For example, the present invention may be carried out by being modified as follows.

In embodiment 4, on the basis of the switching determination of embodiment 3, it is added to the reduction conditions that the engine is neither under an idling operation nor under a warming-up operation at the time of start. However, the corresponding effect can be obtained by adding only any one of the conditions that the engine is not under an idling operation, and the engine is not under a warming-up operation, to the reduction conditions. Further, on the basis of the switching determination of embodiment 1 or embodiment 2, the conditions that the engine is not under an idling operation, and the engine is not under a warming-up operation may be added to the reduction condition.

Further, in the embodiments, the throttles are used as the actuators for air amount control, but an intake valve with a variable lift amount or a variable operation angle also can be used.

Further, in the embodiments, the change speed of the required torque is reduced by the low-pass filter, but a so-called averaging operation may be used. As one example of the averaging operation, weighted average can be cited.

Further, in the embodiments, the ratio of the required torque and the estimated torque is calculated as the indication efficiency, and the ignition timing is controlled in accordance with the indication efficiency, but with respect to embodiments 1 to 3, the indication efficiency can be fixed to one. More specifically, the ignition timing can be fixed to the optimal ignition timing.

DESCRIPTION OF REFERENCE NUMERALS

2 Controller
4 Throttle
6 Ignition device
8 Fuel injection device
10 Required torque determining unit
12 Required efficiency determining unit
14 Required air-fuel ratio determining unit
16 Air amount controlling torque calculating unit
18 Target air amount calculating unit
20 Throttle opening degree calculating unit
22 Estimated torque calculating unit
24 Ignition timing controlling efficiency calculating unit
26 Ignition timing calculating unit
28 Fuel injection amount calculating unit
30 Required air-fuel ratio calculating unit
32 Low-pass filter
34 Switch
36 Switching determining unit

The invention claimed is:

1. A control device for an internal combustion engine, comprising:
required torque determining means which determines a required value of torque (hereinafter, required torque) generated by the internal combustion engine;
required air-fuel ratio determining means which determines a required value of an air-fuel ratio (hereinafter, a required air-fuel ratio) of an air-fuel mixture provided for combustion;
target air amount calculating means which calculates a target air amount for realizing the required torque under the required air-fuel ratio, based on data with a relationship between the torque generated by the internal combustion engine and an air amount taken into a cylinder being set by being linked with the air-fuel ratio;
air amount control means which operates an actuator for air amount control in accordance with the target air amount; and
fuel injection amount control means which operates an actuator for fuel injection amount control in accordance with the required air-fuel ratio,
wherein the required air-fuel ratio determining means comprises
required air-fuel ratio calculating means which receives a requirement relating to exhaust gas performance of the internal combustion engine, and calculates an air-fuel ratio which satisfies the requirement as a required air-fuel ratio,
change speed reducing means which processes a signal of the required air-fuel ratio calculated in the required air-fuel ratio calculating means to reduce a change speed of the required air-fuel ratio, and
final determining means which determines a required air-fuel ratio with the change speed reduced by the change speed reducing means as a final required air-fuel ratio when a predetermined reduction condition is satisfied, and determines the required air-fuel ratio which is calculated in the required air-fuel ratio calculating means as a final required air-fuel ratio when the reduction condition is not satisfied, the reduction condition includes a condition that the change amount of a calculated value of the required air-fuel ratio calculating means is larger than a predetermined air-fuel ratio change determination value;

target air amount increasing means which increases the target air amount to compensate for a decrease of torque accompanying retardation of an ignition timing when there is a requirement for retarding the ignition timing from an optimal ignition timing; and ignition timing control means which operates an actuator for ignition timing control so that torque which is realized under the required air-fuel ratio corresponds to the required torque when the actuator for air amount control is operated in accordance with the increased target air amount; and wherein the reduction condition further includes a condition that a retardation amount of the ignition timing with respect to the optimal ignition timing is smaller than a predetermined threshold value.

2. The control device for an internal combustion engine according to claim 1, wherein the reduction condition further includes a condition that a load of the internal combustion engine is larger than a predetermined load determination value.

3. The control device for an internal combustion engine according to claim 1, wherein the air-fuel ratio change determination value is variable in accordance with the load of the internal combustion engine.

4. The control device for an internal combustion engine according to claim 1,
wherein the requirement for retarding the ignition timing from the optimal ignition timing is a requirement which is issued when an idling operation of the internal combustion engine is performed, and
the reduction condition includes a condition that the internal combustion engine is not under an idling operation.

5. The control device for an internal combustion engine according to claim 1,
wherein the requirement for retarding the ignition timing from the optimal ignition timing is a requirement which is issued when a warming-up operation at a time of start of the internal combustion engine is performed, and
the reduction condition includes a condition that the internal combustion engine is not under a warming-up operation at a time of start of the internal combustion engine.

6. The control device for an internal combustion engine according to claim 4,
wherein the requirement for retarding the ignition timing from the optimal ignition timing is a requirement which is issued when a warming-up operation at a time of start of the internal combustion engine is performed, and
the reduction condition includes a condition that the internal combustion engine is not under a warming-up operation at a time of start of the internal combustion engine.

* * * * *